US010866603B2

United States Patent
Styron et al.

(10) Patent No.: US 10,866,603 B2
(45) Date of Patent: Dec. 15, 2020

(54) WAX THERMOSTAT

(71) Applicant: Ford Global Technologies, LLC, Dearborn, MI (US)

(72) Inventors: Joshua Putman Styron, Canton, MI (US); Michael Joseph Giunta, Livonia, MI (US); Peter Rowling, Bloomfield Hills, MI (US); Erik Thomas Andersen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 813 days.

(21) Appl. No.: 14/519,601

(22) Filed: Oct. 21, 2014

(65) Prior Publication Data
US 2016/0109890 A1 Apr. 21, 2016

(51) Int. Cl.
G05D 23/02 (2006.01)
F01P 7/16 (2006.01)

(52) U.S. Cl.
CPC ............ G05D 23/022 (2013.01); F01P 7/16 (2013.01)

(58) Field of Classification Search
CPC ... F01P 7/16; F01P 7/165; F01P 7/167; G05D 23/022; G05D 23/02; G05D 23/021; G05D 23/1333
See application file for complete search history.

(56) References Cited

U.S. PATENT DOCUMENTS

| 4,285,465 A | * | 8/1981 | North | G05D 23/022 236/12.11 |
| 4,580,531 A | * | 4/1986 | N'Guyen | F01P 7/048 123/41.1 |
| 4,621,594 A | | 11/1986 | Kubis | |
| 5,513,732 A | * | 5/1996 | Goates | F16H 61/0021 192/3.3 |
| 6,044,645 A | * | 4/2000 | Greenan | F16H 57/0412 60/337 |
| 6,539,899 B1 | | 4/2003 | Piccirilli et al. | |
| 6,695,737 B2 | * | 2/2004 | Park | F16H 57/04 137/625.64 |
| 7,096,831 B2 | | 8/2006 | Finkbeiner et al. | |
| 7,172,135 B2 | | 2/2007 | Masuko et al. | |
| 8,061,309 B2 | | 11/2011 | Lenz et al. | |
| 8,109,242 B2 | | 2/2012 | Deivasigamani | |
| 8,181,610 B2 | * | 5/2012 | Dipaola | F01P 7/165 123/41.01 |
| 8,651,069 B2 | | 2/2014 | Borgia et al. | |
| 9,097,182 B2 | * | 8/2015 | Chillar | F01D 17/085 |

(Continued)

FOREIGN PATENT DOCUMENTS

CN 103282618 A 9/2013
EP 1405991 A1 4/2004

(Continued)

Primary Examiner — Nelson J Nieves
Assistant Examiner — Meraj A Shaikh
(74) Attorney, Agent, or Firm — Geoffrey Brumbaugh McCoy Russell LLP

(57) ABSTRACT

Various systems for controlling coolant flow through a plurality of coolant lines via a wax thermostat are provided. In one embodiment, a thermostat comprises at least one wax motor that mediates coolant flow between two inlet passages and three outlet passages as a function of longitudinal position, the longitudinal position varying in response to changes in coolant temperature.

18 Claims, 9 Drawing Sheets

(56) References Cited

U.S. PATENT DOCUMENTS

| | | |
|---|---|---|
| 2009/0183696 A1 | 7/2009 | O'Flynn et al. |
| 2010/0181516 A1* | 7/2010 | Palanchon ......... G05D 23/1333 251/324 |
| 2011/0214627 A1* | 9/2011 | Nishikawa .............. F01P 7/165 123/41.02 |
| 2014/0283764 A1* | 9/2014 | Abou-Nasr ............. F01P 7/162 123/41.02 |

FOREIGN PATENT DOCUMENTS

| | | |
|---|---|---|
| EP | 1674689 A2 | 6/2006 |
| EP | 2037097 A2 | 3/2009 |
| JP | S5547074 A | 4/1980 |
| WO | 2014078255 A2 | 5/2014 |

* cited by examiner

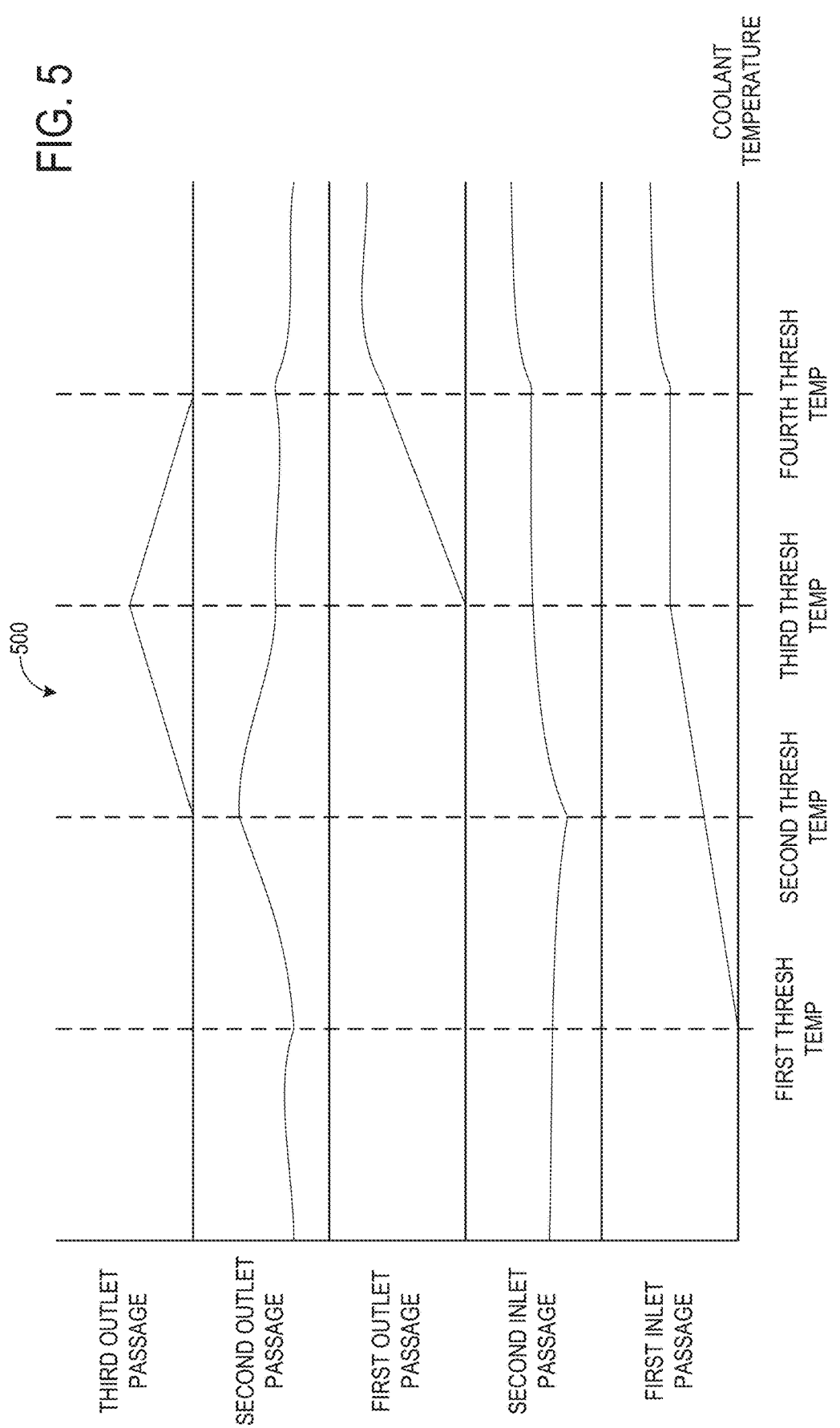

… (1)

WAX THERMOSTAT

FIELD

The field of the disclosure relates to thermostats used to control coolant flow in internal combustion engines.

BACKGROUND AND SUMMARY

Many internal combustion engines include a cooling system to maintain engine temperature within a desired range and prevent overheating that can degrade engine operation. For example, a cooling system may include a coolant circuit in which coolant is circulated throughout an engine and subsequently routed to a heat exchanger such as a radiator mounted near the front of a vehicle in which the engine is disposed. The radiator facilitates the transfer of heat from the coolant to the surrounding environment. Coolant, and in some cases heated coolant, may be circulated to other vehicle components, such as a heater core that enables heating of a passenger compartment. To control coolant flow through the coolant circuit, the cooling system may include one or more valves and/or thermostats.

In some approaches, an electronically controlled valve (e.g., rotary valve) may be configured as a thermostat and used to control coolant flow through a coolant circuit. In particular, the position of the valve, which may be controlled via an electric motor, mediates coolant flow through various passages in which various devices configured to selectively receive coolant are positioned. In this way, coolant flow through the various passages may be controlled via the valve position in response to one or more operating conditions, such as engine coolant temperature.

The inventors herein have identified several issues with the approach identified above. For example, the use of an electronic valve mechanism to control coolant flow in an engine can increase cost and control complexity. Further, certain types of degradation specific to electronic valves can occur, such as motor degradation.

One approach that at least partially addresses the above issues includes a thermostat comprising at least one wax motor that mediates coolant flow between two inlet passages and three outlet passages as a function of longitudinal position, the longitudinal position varying in response to changes in coolant temperature.

In a more specific example, the at least one wax motor comprises at least one wax whose volume changes in response to changes in coolant temperature, the volume changes causing the variation in the longitudinal position.

In this way, coolant flow between a plurality of coolant lines in a coolant circuit may be controlled in a self-regulated manner in response to the temperature of coolant flowing through a thermostat using at least one wax motor. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a graph of coolant flow through various passages in a thermostat that utilizes at least one wax motor.

DETAILED DESCRIPTION

Figure 1:
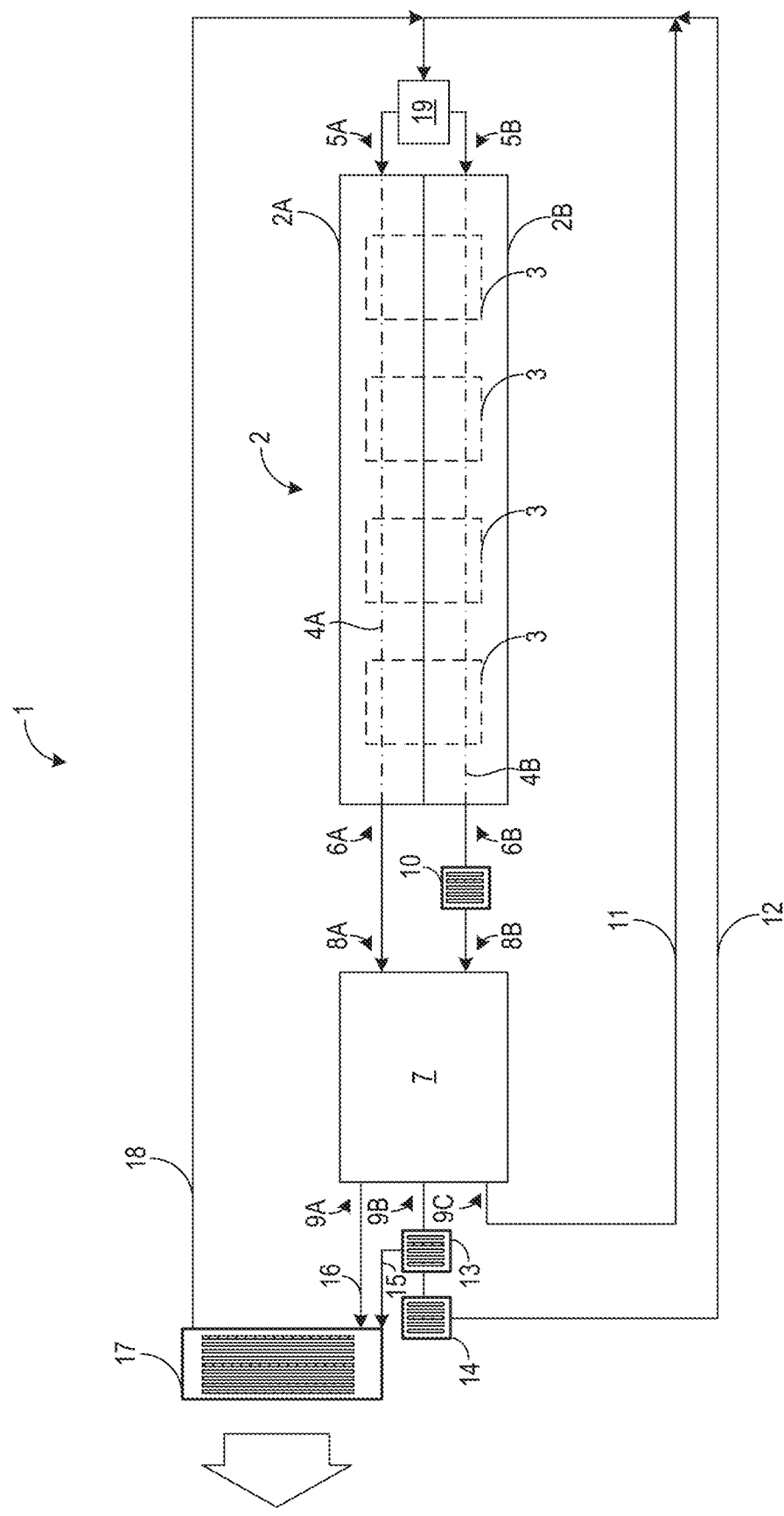
FIG. 1 shows an example coolant circuit.
Figure 2:
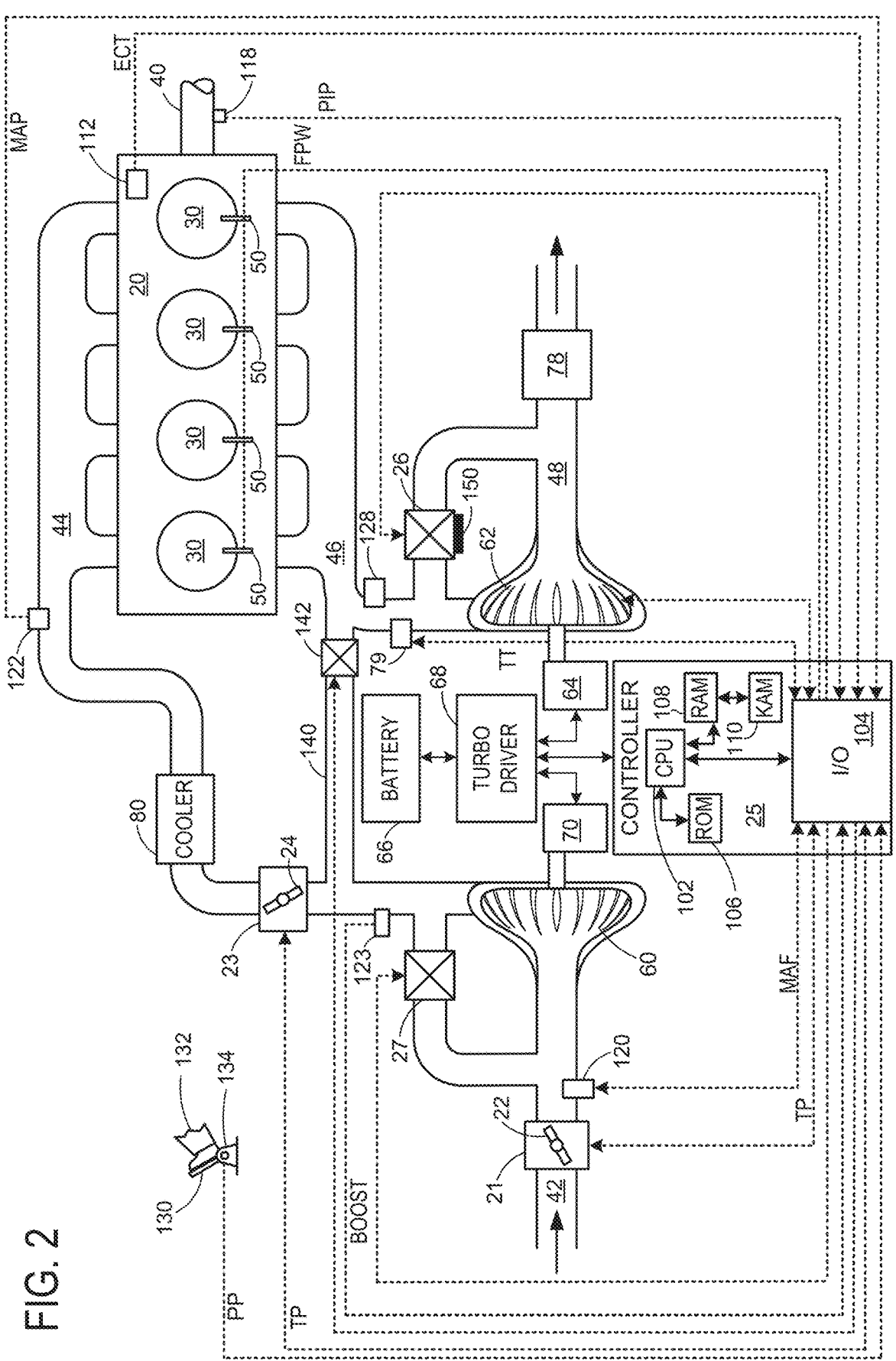
FIG. 2 is a schematic diagram showing an example engine.

Various systems for controlling coolant flow through a plurality of coolant lines via a wax thermostat are provided. In one embodiment, a thermostat comprises at least one wax motor that mediates coolant flow between two inlet passages and three outlet passages as a function of longitudinal position, the longitudinal position varying in response to changes in coolant temperature. FIG. 1 shows an example coolant circuit, FIG. 2 is a schematic diagram showing an example engine, FIGS. 3A-E show various operating states of a thermostat having a single wax motor, FIGS. 4A-E show various operating states of a thermostat having dual wax motors, and FIG. 5 shows a graph of coolant flow through various passages in a thermostat that utilizes at least one wax motor.

FIG. 1 shows an example coolant circuit 1. Coolant circuit 1 includes an engine 2 comprising a cylinder head 2A coupled to an engine block 2B positioned below the cylinder head. Cylinder head 2A and engine block 2B may be coupled to each other in various suitable manners (e.g., via bolting), though in other embodiments the cylinder head and engine block may be integrally formed as a single component. Together, cylinder head 2A and engine block 2B form a plurality of cylinders 3 in which fuel combustion may take place. Additional detail regarding the configuration and operation of engine 2 is provided below with reference to FIG. 2.

As shown in FIG. 1, coolant lines 4A and 4B, which form part of coolant circuit 1, are positioned within cylinder head 2A and engine block 2B, respectively, and enable coolant flow therethrough to enable heat transfer from their respective engine component to the coolant. Coolant lines 4A and 4B receive coolant from inlets 5A and 5B, and expel heated coolant via outlets 6A and 6B, respectively. One or both of cylinder head 2A and engine block 2B may include cylinder jackets that enable coolant flow therethrough and at least partially surround cylinders 3 so that heat may be extracted from the cylinders and transferred to the coolant in the cylinder jackets. In this example, inlets 5A and 5B may be in fluidic communication with their respective coolant jacket inlets, and outlets 6A and 6B may be in fluidic communication with their respective coolant jacket outlets. Other configurations are contemplated, however, such as those in which a single, integrated coolant jacket is provided in engine 2. In this example, the integrated coolant jacket may span both cylinder head 2A and engine block 2B, and may include a single inlet and outlet that respectively receive and expel coolant.

In the embodiment depicted in FIG. 1, outlets 6A and 6B are in fluidic communication with a thermostat 7, being respectively coupled to a head inlet 8A and a block inlet 8B of the thermostat. As described in further detail below with reference to FIGS. 3A-4E, thermostat 7 mediates coolant flow as a function of its position among head and block inlets 8A and 8B, and three thermostat outlets: a radiator outlet 9A, a component outlet 9B, and a bypass outlet 9C.

In some examples, a plurality of components may be positioned between outlet 6B and block inlet 8B, and, as such, may receive coolant expelled from engine block 2B. One such component is generically indicated at 10. For example, the plurality of components may include an oil cooler configured to transfer heat between engine oil and coolant to thereby control the temperature of the oil, an automatic transmission warmup unit (ATWU) configured to transfer heat between coolant and transmission fluid to thereby control the temperature of a transmission, an exhaust gas recirculation (EGR) cooler configured to receive heated coolant so that the temperature of recirculated exhaust gas exhausted from engine 2 may be controlled to a desired temperature (e.g., via a heat exchanger), etc. Details regarding the configuration and operation of an example EGR system are provided below with reference to FIG. 2.

Depending on its position, thermostat 7 may route coolant flow through bypass outlet 9C, which is in fluidic communication with a bypass line 11. Bypass line 11 may enable heated coolant expelled from engine 2 to be routed back to the engine; as the bypass line does not include cooling elements, the heated coolant may be routed back to the engine without being significantly cooled. As such, bypass line 11 may be utilized during selected conditions in which the supply of heated coolant to engine 2 is desired to some degree—for example, during engine startup when rapid heating of the engine is desired to minimize emissions. As shown in FIG. 1, coolant flowing through bypass line 11 is routed to a common inlet upstream of inlets 5A and 5B and a coolant pump 19 such that the bypassed coolant may be supplied to both inlets and thus cylinder head 2A and engine block 2B. A valve (not shown) may be positioned at the common inlet to control the distribution of bypassed coolant and particularly the proportion of bypassed coolant delivered to cylinder head 2A versus engine block 2B. Coolant pump 19 may assume various suitable forms and may be operated via an engine controller to achieve desired coolant supply to inlets 5A and 5B.

Depending on its position, thermostat 7 may route coolant flow through component outlet 9B, which is in fluidic communication with a component line 12. A plurality of components may be positioned along component line 12 and configured to receive heated coolant expelled from engine 2—for example, the plurality of components may include an oil cooler 13. The plurality of components positioned along component line 12 may alternatively or additionally include a heater core 14 which may include a heat exchanger configured to transfer heat from received, heated coolant to surrounding air, an ATWU, etc. This air may then be drawn into a passenger compartment or vehicle cabin, for example via a fan, to provide heating therein. FIG. 1 also shows the inclusion of a component bypass line 15 that provides an outlet from oil cooler 13 to a radiator described below, in addition to the outlet from the oil cooler that feeds into heater core 14, which is shown as being positioned downstream of the oil cooler. Component bypass line 15 may enable at least a portion of coolant expelled from oil cooler 13 to be cooled by the radiator. Although not shown, a valve may be included to control the proportion of coolant fed to the radiator versus the portion fed to heater core 14. Other configurations are possible, however—for example, in some embodiments component bypass line 15 may be omitted while in other embodiments the bypass line may feed expelled coolant from an outlet of heater core 14 to the radiator. Regardless, in the embodiment depicted in FIG. 1 component line 12 joins bypass line 11 at a junction upstream of the common inlet to engine 2 and coolant pump 19. While not shown, a valve may be positioned at this junction to control the proportion of coolant reaching the common inlet from bypass line 11 versus the coolant reaching the common inlet from component line 12.

Depending on its position, thermostat 7 may route coolant flow through radiator outlet 9A, which is in fluidic communication with a radiator feed line 16. Radiator feed line 16 feeds into a radiator 17, which is configured to reduce the temperature of coolant flowing therethrough. Once cooled, the cooled coolant may be fed back to engine 2 via a radiator return line 18, which joins the common inlet feeding into the engine upstream of coolant pump 19. In some examples, radiator 17 may be a liquid-to-air heat exchanger. As such, a fan (not shown) may be positioned proximate radiator 17 to assist in reducing the temperature of coolant and expelling heat from the coolant to the surrounding environment. The fan may be controlled in a continuously variable fashion according to engine operating conditions, for example. While not shown, radiator 17 may be in fluidic communication with a coolant reservoir via an inlet and an outlet. It will be appreciated that various suitable coolants may be used in coolant circuit 1—for example, a fluid such as water, a chemical coolant, or a mixture thereof.

It will be appreciated that various modifications may be made to coolant circuit 1 without departing from the scope of this disclosure. The relative arrangement of various components in circuit 1 (e.g., component 10, oil cooler 13, heater core 14, etc.) may be modified—for example, the oil cooler may alternatively be positioned downstream of heater core 14. Further, these components are provided as examples and are not intended to be limiting; one or more of these components may be omitted and/or others not shown in FIG. 1 may be included in circuit 1. The arrangement of the various lines in circuit 1 may be modified as well; the positioning of component bypass line 15 may be adjusted, or in other embodiments, the component bypass line may be omitted. The arrangement of the junction at which bypass line 11 and component line 12 join, and/or the arrangement of the common inlet into which radiator return line 18 feeds may be adjusted as well. Moreover, one or more valves not shown in FIG. 1 may be included in circuit 1 to control coolant flow in various regions.

FIG. 2 is a schematic diagram showing an example engine 20, which may be included in a propulsion system of an automobile. In some embodiments, engine 20 may be engine 2 of FIG. 1, for example. The engine 20 is shown with four cylinders 30. However, other numbers of cylinders may be used in accordance with the current disclosure. Engine 20 may be controlled at least partially by a control system including controller 25, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 20 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 20.

Combustion chambers 30 may receive intake air from intake manifold 44 via intake passage 42 and may exhaust combustion gasses via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 25. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 25 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 25 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 25.

Exhaust passage 48 may receive exhaust gasses from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, AFR, spark retard, etc.

Controller 25 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 25 may receive various signals from sensors coupled to engine 20, in addition to those signals previously discussed, including measurement of inducted mass air flow (MAF) from mass air flow sensor 120; engine coolant temperature (ECT) from temperature sensor 112, shown schematically in one location within the engine 20; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 25 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 20 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 25. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 25.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 25 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gasses. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 25 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 2 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 3A:
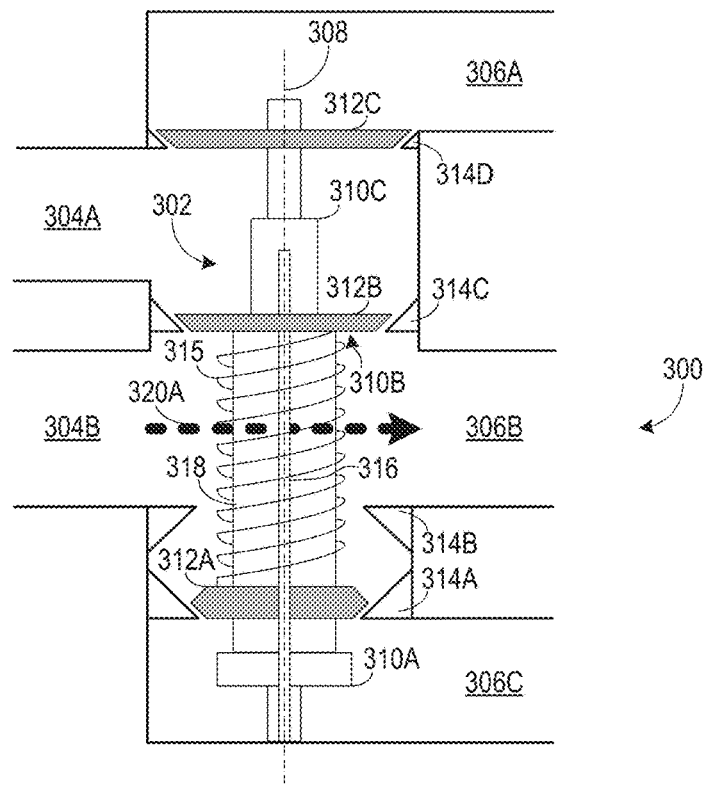
FIGS. 3A-E show various operating states of a thermostat having a single wax motor.

FIGS. 3A-E show various operating states of a thermostat 300 having a single wax motor 302. As shown in FIG. 3A, thermostat 300 is configured to mediate coolant flow among five passages: a first inlet passage 304A, a second inlet passage 304B, a first outlet passage 306A, a second outlet passage 306B, and a third outlet passage 306C. In some examples, thermostat 300 may be thermostat 7 of FIG. 1; as such, a correspondence between the five coolant passages of thermostat 300 and the two inlets and three outlets of thermostat 7 may exist—namely, first inlet passage 304A may be in fluidic communication with block inlet 8B, second inlet passage 304B may be in fluidic communication with head inlet 8A, first outlet passage 306A may be in fluidic communication with radiator outlet 9A, second outlet passage 306B may be in fluidic communication with component outlet 9B, and third outlet passage 306C may be in fluidic communication with bypass outlet 9C. With reference to FIG. 1, in this example first inlet passage 304A may receive coolant expelled from an engine block (e.g., engine block 2B), second inlet passage 304B may receive coolant expelled from a cylinder head (e.g., cylinder head 2A), first outlet passage 306A may route coolant to a radiator (e.g., radiator 17 via radiator feed line 16), second outlet passage 306B may route coolant to a plurality of components (e.g., via component line 12), and third outlet passage 306C may route coolant to a bypass line (e.g., bypass line 11).

Figure 3B:
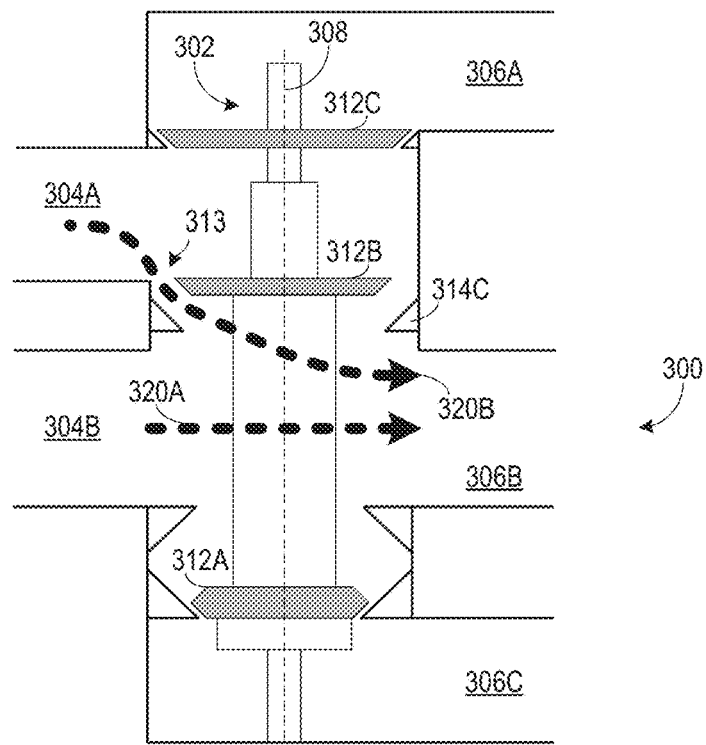
Figure 3C:
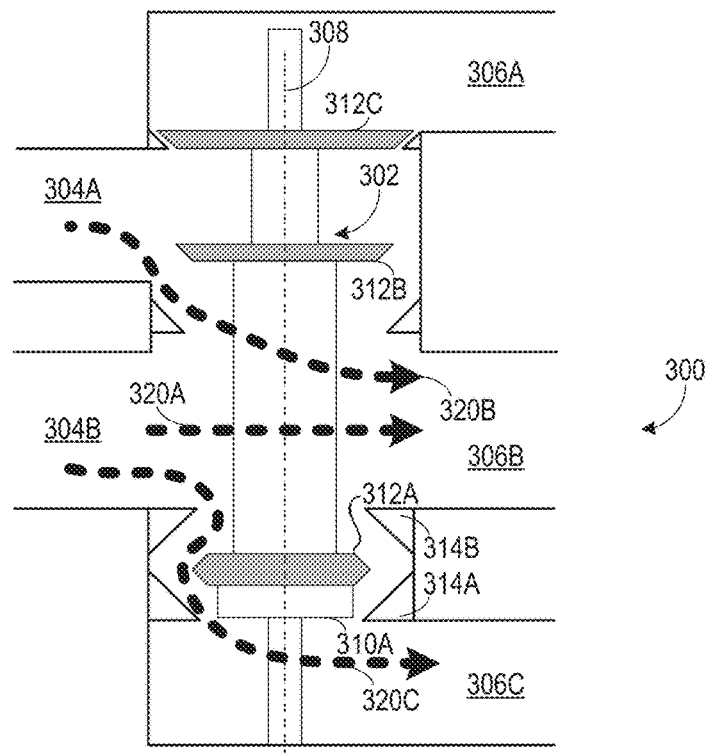

The distribution of coolant (e.g., engine coolant) flow through passages 304A-C and 306A-B may be controlled by varying the position of wax motor 302 along a longitudinal axis 308. Wax motor 302 includes geometric features that may or may not engage three valves in thermostat 300 depending on the longitudinal position of the wax motor; for example, a first shoulder 310A is configured to engage a first valve 312A that controls coolant flow between second inlet passage 304B and third outlet passage 306C, a second shoulder 310B is configured to engage a second valve 312B that controls coolant flow between first inlet passage 304A and second outlet passage 306B, and a third shoulder 310C is configured to engage a third valve 312C that controls coolant flow between first inlet passage 304A and first outlet passage 306A. Valves 312A, 312B, and 312C may thus be referred to as a valve assembly driven by wax motor 302, which positions the valves to control coolant flow. Each shoulder 310 has a corresponding longitudinal position of wax motor 302 at which the shoulder engages (e.g., makes physical contact in an upward direction along longitudinal axis 308) its corresponding valve 312. When sufficient additional force is applied to a given valve 312 upwardly along longitudinal axis 308 (e.g., due to the upward motion of wax motor 302 along the longitudinal axis) by its corresponding shoulder 310, the shoulder causes the valve to disengage from its corresponding valve seat 314, where, when engaged with the valve seat it resides in a fully closed position, and move upwardly toward an at least partially open position, allowing at least some coolant flow between the passages it controls. In the depicted implementation, first valve 312A has a lower valve seat 314A and an upper valve seat 314B, second valve 312B has a valve seat 314C, and third valve 312C has a valve seat 314D. Thermostat 300 is configured such that, when a valve 312 assumes an at least partially open position, a gap (e.g., gap 313 of FIG. 3B) is formed between its outer perimeter and the surfaces of its corresponding valve seat 314 with which the valve engages when in its fully closed position, such that coolant may flow through the gap. As an illustrative example, FIG. 3A shows first valve 312A in its fully closed position and in sealing, physical contact with lower valve seat 314A. In FIG. 3B, wax motor 302 has assumed a different longitudinal position that is farther advanced upwardly relative to its longitudinal position shown in FIG. 3A; in this position, first shoulder 310A begins to engage in physical contact with the bottom surface of first valve 312A. In FIG. 3C, wax motor 302 has advanced yet further upwardly along longitudinal axis 308, resulting in the application of a sufficient force by first shoulder 310A to first valve 312A that causes the first valve to disengage lower valve seat 314A and assume a partially open position enabling coolant flow between second inlet passage 304B and third outlet passage 306C.

Thermostat 300 may include suitable mechanisms to enable the longitudinal motion of valves 312 and restrain the valves in their fully closed positions against their corresponding valve seats 314 when wax motor 302 is at a longitudinal position that closes the valves, such as the first longitudinal position shown in FIG. 3A in which coolant flows between second inlet passage 304B and second outlet passage 306B, and not between the other passages. FIG. 3A shows the inclusion of a bias (e.g., spring) 315 coupled at a top end to the bottom surface of second valve 312B and at a lower end to the upper surface of first valve 312A. Bias 315 may maintain first valve 312A in its fully closed position until a certain condition is satisfied, at which point the bias may compress as the distance between the first valve and second valve 312B decreases. For example, the condition may be such that first valve 212A opens when backpressures equal to or greater than a threshold backpressure act against the first valve. The force constant (e.g., spring constant) of bias 315 may selected to achieve this condition. Since such backpressures may correspond to engine (e.g., pump) speed, flow control, and particularly valve opening timings, may proceed according to pump speed. Alternative configurations of bias 315 are possible without departing from the scope of this disclosure; for example, the top end of the bias may instead be coupled to valve seat 314C. Moreover, bias 315 may be positioned between a different pair of valves. Still further, two or more biases between two or more pairs of valves may be provided.

In some examples, valves 312 may be partially toroidal with a hollow bore through their centers whose diameters are large enough to accommodate sliding motion of a corresponding portion of wax motor 302 therethrough yet small enough to enable their corresponding shoulders 310 to catch against their bottom surfaces and drive the valves upwardly with sufficient application of force. A suitable mechanism may be included to facilitate this selective restraint and sliding motion of valves 312, such as a bushing affixed to the bore (e.g., the inner bore surface).

Wax motor 302 may undergo longitudinal motion along longitudinal axis 308 by converting thermal energy into mechanical energy. Specifically, the material composition of wax motor 302 may include one or more waxes whose volumes change as a function of temperature. Thus, the reception of thermal energy in coolant flowing proximate (e.g., across) wax motor 302 (e.g., heated coolant expelled from engine 20 of FIG. 2) may cause a change in the volume of the one or more waxes of the wax motor, resulting in longitudinal motion of the wax motor. In particular, an increase in the volume of wax motor 302 may cause upward advancement along longitudinal axis 308. In this way, thermostat 300 may self-regulate coolant flow through its passages as a function of the temperature of the coolant flowing through the thermostat.

In some embodiments, wax motor 302 may include a rod 316 comprising one or more non-wax materials (e.g., one or more metals) positioned along longitudinal axis 308 and extending at least a portion of the height of the wax motor (e.g., from the base of the motor to a region proximate shoulder 310C). A portion of wax motor 302 surrounding rod 316—for example, body 318, which in some examples may be the entirety of the wax motor surrounding the rod—may comprise one or more waxes whose expansion or contraction cooperates with the rod to impart longitudinal motion to the wax motor. For example, wax expansion may push against rod 316, causing the rod to slide longitudinally. In some implementations, an annular component (e.g., bushing) may concentrically surround rod 316 to enable sliding motion of body 318 about the rod. In some configurations, body 318 may be in physical contact with coolant flowing from at least one inlet passage regardless of the longitudinal position of wax motor 302.

As described above, the material composition of wax motor 302 (e.g., body 318) may include one or more waxes. In some embodiments, one or more waxes may be included in wax motor 302 whose material properties are selected such that desired correspondences between wax volume changes, longitudinal positions, and coolant temperatures are achieved. Specifically, the one or more waxes may be chosen so that wax motor 302 begins to undergo longitudinal motion when coolant of a particular temperature flows across the wax motor. In this way, coolant temperature and the material properties of the one or more waxes in wax motor 302 may cooperate to enable self-regulation of coolant flow through the wax motor. The one or more waxes may also be chosen so that a desired rate of longitudinal motion of wax motor 302 results when temperature changes occur in the coolant flowing across the wax motor—e.g., the one or more waxes may be selected in view of a desired rate of motion in distance per degree temperature change (e.g., mm/° C.). Changes in the longitudinal position of wax motor 302 may result from expansion of the volume of the one or more waxes; these volume changes may or may not be accompanied by changes in phase of the one or more waxes (e.g., a phase transition from solid to liquid). Accordingly, temperature changes in the coolant flowing across wax motor 302 may cause continuous changes in the longitudinal position of the wax motor, facilitating continuous placement of the wax motor and thus continuous coolant flow control. For approaches in which a single wax is used in wax motor 302, the single wax may be selected for its material properties, which enable initiation of longitudinal motion of the wax motor when a particular desired coolant temperature flows across the wax motor. In other approaches, two or more waxes may be selected such that, at a first coolant temperature, a first wax of the two or more waxes undergoes expansion that initiates longitudinal motion of wax motor 302, while, at a second coolant temperature (e.g., greater than the first coolant temperature), a second wax of the two or more waxes undergoes expansion that initiates longitudinal motion of the wax motor at a different rate than that exhibited for coolant temperatures less than the second coolant temperature, for example. The two or more waxes may be blended to various suitable degrees (e.g., such that an approximately uniform mixed wax composition is provided, in which the two or more mixed waxes may be referred to as a single wax blend), or in other examples different waxes may be separated but in physical contact.

FIG. 3A particularly shows wax motor 302 in a first (longitudinal) position. In the first position, all valves 312A, 312B, and 312C reside in their fully closed positions and in contact with their respective valve seats (seats 314A, 314C, and 314D). As such, coolant flows between second inlet passage 304B and second outlet passage 306B (a first coolant flow represented by arrow 320A), and not between the other passages. With reference to FIG. 1, the first position may allow coolant flow between head inlet 8A and component outlet 9B and thus between cylinder head 2A and component line 12, for example, in which case heated coolant expelled from the cylinder head may be supplied to the components positioned along the component line. Wax motor 302 may assume the first position for a first range of coolant temperatures up to a first threshold coolant temperature. The first range of coolant temperatures may include relatively low temperatures including those associated with cold engine start (e.g., an engine cold start temperature of 0° C.), for example. At the first position, a clearance exists between the top of wax motor 302 and the upper surface of first outlet passage 306A.

FIG. 3B shows wax motor 302 in a second position that is farther advanced along longitudinal axis 308 relative to the first position. In the second position, first and third valves 312A and 312C remain in their fully closed positions, while second valve 312B has assumed a partially open position, disengaging from contact with its associated valve seat 314C. As a result, coolant flows between first inlet passage 304A and second outlet passage 306B (a second coolant flow represented by arrow 320B), in addition to the coolant flow between second inlet passage 304B and the second outlet passage, and not between the other passages. With reference to FIG. 1, the second position may allow coolant flow between block inlet 8B and component outlet 9B and thus between engine block 2B and component line 12, for example, in which case heated coolant expelled from the engine block may be supplied to the components positioned along the component line. The rate of transfer of thermal energy to such components may be greater when wax motor 302 is in the second position than when it is in the first position. Wax motor 302 may assume the second position for a second range of coolant temperatures up to a second threshold coolant temperature. The second range of coolant temperatures may be greater than the first range of coolant temperatures. In the second position, a clearance still remains between the top of wax motor 302 and the upper surface of first outlet passage 306A, while a greater clearance has occurred between first shoulder 310A and the bottom surface of third outlet passage 306C, relative to the clearance between these elements associated with the first position. Thermostat 300 may include suitable components not shown in FIGS. 3A-E to support bidirectional motion of wax motor 302 along longitudinal axis 308 and particularly such motion in and out of the lower surface of third outlet passage 306C and, at some positions, in and out of the top surface of first outlet passage 306A.

FIG. 3C shows wax motor 302 in a third position that is farther advanced along longitudinal axis 308 relative to the second position. In the third position, third valve 312C remains at its fully closed position, while first valve 312A has assumed an at least partially open position, disengaging from contact with its associated lower valve seat 314A. At the third position, first valve 312A may be approximately equally spaced (e.g., within 5 mm) between lower and upper valve seats 314A and 314B. Relative to its placement at the second position, second valve 312B has assumed a more open position (e.g., a fully open position), increasing its separation from its associated valve seat 314C. As a result, coolant flows between second inlet passage 304B and third outlet passage 306C (a third coolant flow represented by arrow 320C), in addition to the coolant flow between second inlet passage 304B and the second outlet passage and between first inlet passage 304A and the second outlet passage, and not between the other passages. With reference to FIG. 1, the third position may allow coolant flow between head inlet 8A and bypass outlet 9C and thus between cylinder head 2A and bypass line 11, for example, in which case a greater amount of uncooled coolant may be rerouted back to engine 2, relative to the first and second positions. Wax motor 302 may assume the third position for a third range of coolant temperatures up to a third threshold coolant temperature. The third range of coolant temperatures may be greater than the second range of coolant temperatures. In the third position, relative to the second position, the clearance between the top of wax motor 302 and the upper surface of first outlet passage 306A has decreased, while the clearance between first shoulder 310A and the bottom surface of third outlet passage 306C has increased.

Figure 3D:
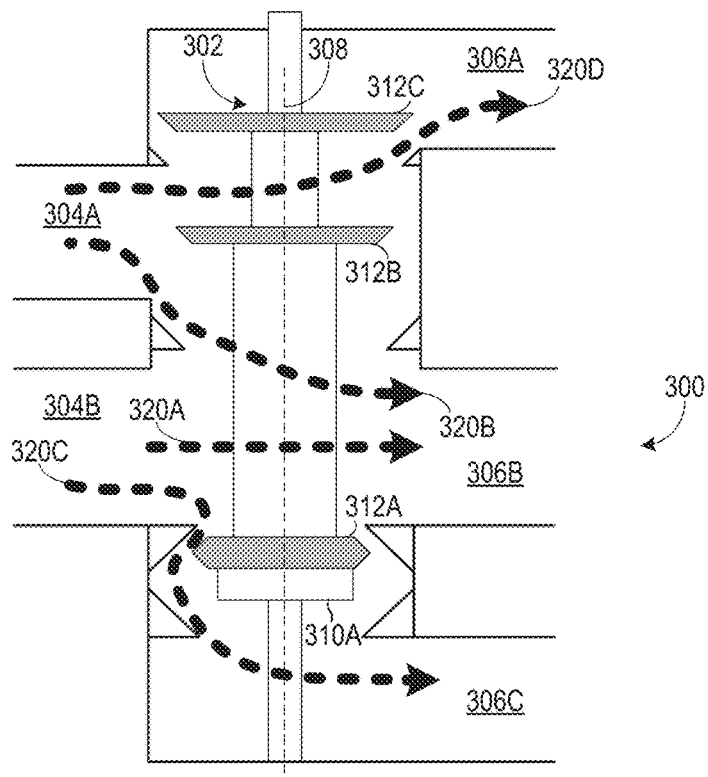

FIG. 3D shows wax motor 302 in a fourth position that is farther advanced along longitudinal axis 308 relative to the third position. In the fourth position, relative to the third position, first valve 312A has advanced farther along longitudinal axis 308, moving away from lower valve seat 314A and approaching upper valve seat 314B, where it assumes an at least partially open position. Second valve 312B has also advanced farther along longitudinal axis 308, increasing its separation from valve seat 314C and continuing to reside in an at least partially open position (e.g., a fully open position). Third valve 312C, whose bottom surface came into contact with third shoulder 310C at the third position, has now assumed an at least partially open position by receiving upward force imparted by the third shoulder, disengaging from contact with valve seat 314D. As a result of such valve placement, coolant flows between first inlet passage 304A and first outlet passage 306A (a fourth coolant flow represented by arrow 320D), in addition to the coolant flow between the first inlet passage and second outlet passage 306B, second inlet passage 304B and the second outlet passage, and the second inlet passage and third outlet passage 306B. Thus, in the fourth position, all (e.g., both) inlet passages of thermostat 300 expel coolant while all outlet passages receive coolant. With reference to FIG. 1, the fourth position may allow coolant flow between block inlet 8B and radiator outlet 9A and thus between engine block 2B and radiator 17, for example. In the fourth position, a portion of coolant received by the inlet passages of thermostat 300 (e.g., coolant received through first inlet passage 304A) may be cooled via a radiator, while a different portion of coolant (e.g., coolant received through second inlet passage 304B) may be bypassed around the radiator and not cooled. When in the fourth position, thermostat 300 may facilitate the supply of a blend of cooled and uncooled coolant to engine 2 (FIG. 1). Wax motor 302 may assume the fourth position for a fourth range of coolant temperatures up to a fourth threshold coolant temperature. The fourth range of coolant temperatures may be greater than the third range of coolant temperatures. In the fourth position, relative to the third position, a clearance between the top of wax motor 302 and the upper surface of first outlet passage 306A no longer exists, while the clearance between first shoulder 310A and the bottom surface of third outlet passage 306C has increased. As described above, thermostat 300 may include suitable components not shown in FIGS. 3A-E to support the reception of a top portion of the wax motor at the top surface of first outlet passage 306A.

Figure 3E:
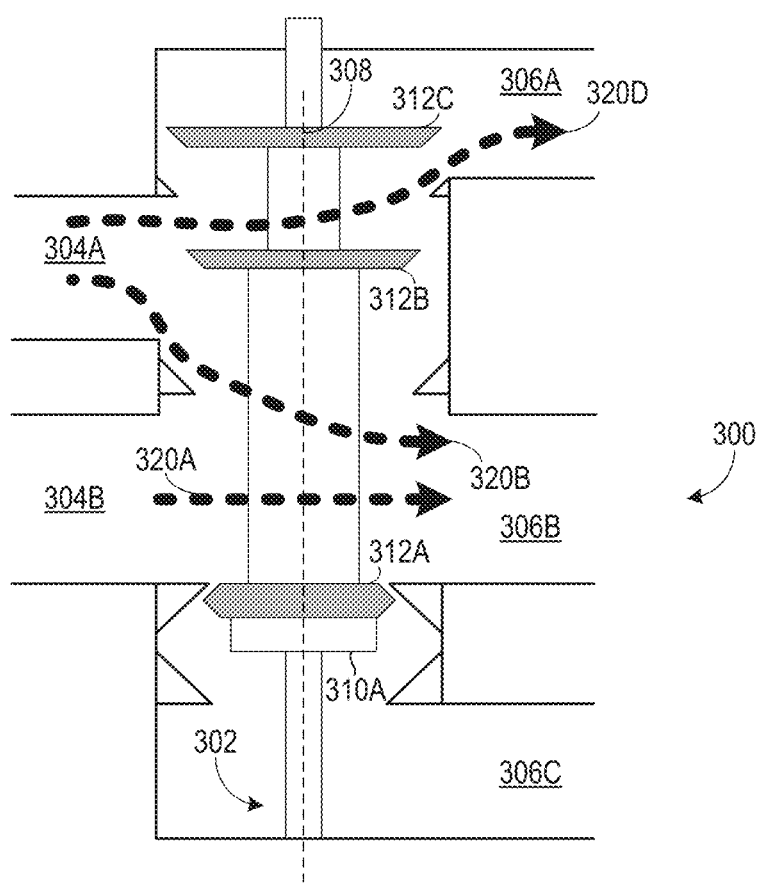

FIG. 3E shows wax motor 302 in a fifth position that is father advanced along longitudinal axis 308 relative to the fourth position. In the fifth position, relative to the fourth position, second and third valves 312B and 312C have both advanced farther along longitudinal axis 308, increasing the separation from their respective valve seats (valve seats 314C and 314D). As such, second and third valves 312B and 312C continue to reside in at least partially (e.g., fully) open positions. First valve 312A has also advanced farther along longitudinal axis 308 relative to its position associated with the fourth wax motor position, but has now come into contact at its upper surface with upper valve seat 314B, assuming a fully closed position. As a result of such valve placement, coolant no longer flows between second inlet passage 304B and third outlet passage 306C. On the other hand, coolant flow continues between first inlet passage 304A and first outlet passage 306A, the first inlet passage and second outlet passage 306B, and second inlet passage 304B and the second outlet passage. With reference to FIG. 1, the fifth position may block coolant flow between head inlet 8A and bypass outlet 9C. As such, coolant cooling may be maximized by maximizing the portion of coolant received by thermostat 300 that is routed through and cooled by a radiator. In this way, wax motor 302 allows thermostat 300 to automatically maximize cooling through the radiator in response to relatively high coolant temperatures, as these temperatures, when in thermal communication with the wax motor, cause a change in volume of the wax motor that drives its placement in the fifth position where cooling may be maximized. Wax motor 302 may assume the fifth position for a fifth range of coolant temperature, which may include a maximum coolant temperature. The fifth range of coolant temperatures may be greater than the fourth range of coolant temperatures. In the fifth position, the clearance between first shoulder 310A and the bottom surface of third outlet passage 306C may be maximized.

Various modifications may be made to thermostat 300 without departing from the scope of this disclosure. For example, the coolant flows of thermostat 300 at the five positions shown in FIGS. 3A-E may be modified without departing from the scope of this disclosure; the thermostat may be configured such that coolant flow is established between virtually any pair of inlet and outlet passages at any position. Generally, the approaches described herein may apply to a wax motor thermostat configured to mediate coolant flow between at least two passages. Moreover, the number and geometric arrangement of the inlet and outlet passages may be modified, with accompanying changes to other elements of thermostat 300 possible (e.g., changes to the arrangement of the valves, valve seats, shoulders, etc.). While wax motor 302 is depicted as undergoing longitudinal motion along longitudinal axis 308, the wax motor may undergo alternative or additional types of motion; for example, the wax motor may achieve longitudinal motion by undergoing rotational motion in a threaded fashion as its waxe(s) expand. Moreover, the five range of coolant temperatures associated with their respective five wax motor positions may or may not overlap. It will also be understood that wax motor 302 may undergo continuous longitudinal motion as coolant temperatures vary. As such, the first, second, third, fourth, and fifth wax motor positions may include respective ranges of longitudinal positions of wax motor 302. However, in each respective range the wax motor may maintain the corresponding valve assembly configuration (e.g., placements). Thus, the first, second, third, fourth, and fifth wax motor positions may refer to their corresponding valve assembly configurations.

In some examples, wax motor 302 may always be at least partially immersed in coolant flowing across the wax motor—for example, coolant from at least cylinder head 2A (FIG. 2). As such, self-regulation of coolant flow among the passages of wax motor 302 may be facilitated without electronic control of the wax motor or its valves. Other functions described herein, such as allowing coolant flow from engine block 2B later than allowing coolant flow from cylinder head 2A, and allowing bypass coolant flow at relatively elevated coolant temperatures, are also facilitated in a self-regulated manner without electronic control.

Figure 4A:
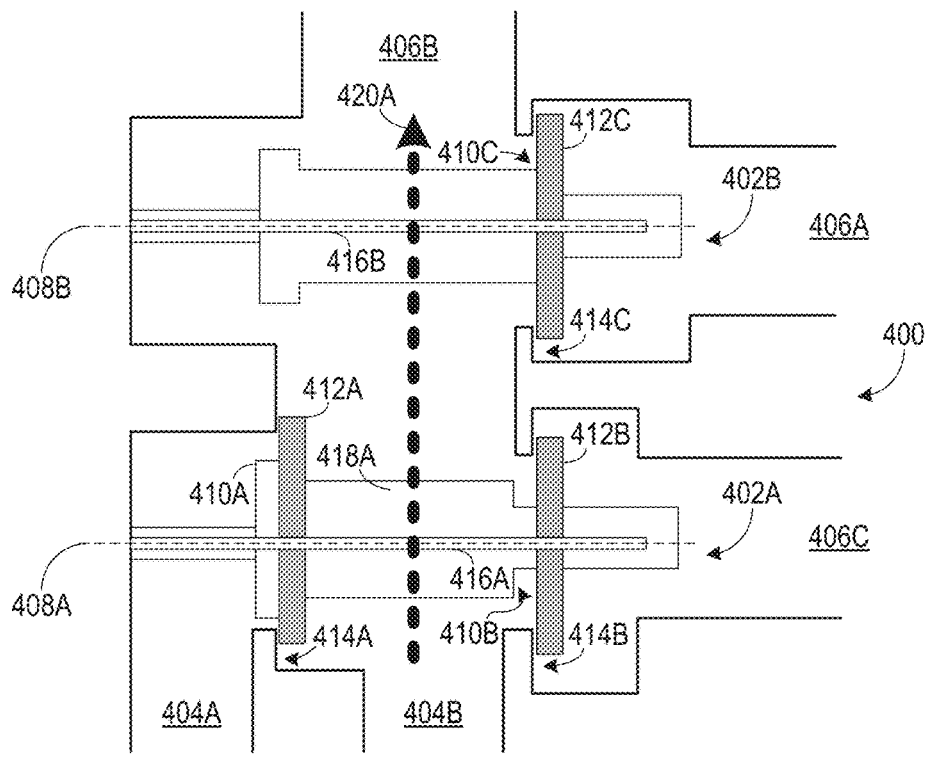
FIGS. 4A-E show various operating states of a thermostat having dual wax motors.

FIGS. 4A-E show various operating states of a thermostat 400 having dual wax motors 402A and 402B. Thermostat 400 exhibits some similarities with thermostat 300 of FIGS. 3A-E. As shown in FIG. 4A, thermostat 400 is configured to mediate coolant flow among five passages: a first inlet passage 404A, a second inlet passage 404B, a first outlet passage 406A, a second outlet passage 406B, and a third outlet passage 406C. In some examples, thermostat 400 may be thermostat 7 of FIG. 1; as such, a correspondence between the five coolant passages of thermostat 400 and the two inlets and three outlets of thermostat 7 may exist— namely, first inlet passage 404A may be in fluidic communication with block inlet 8B, second inlet passage 404B may be in fluidic communication with head inlet 8A, first outlet passage 406A may be in fluidic communication with radiator outlet 9A, second outlet passage 406B may be in fluidic communication with component outlet 9B, and third outlet passage 406C may be in fluidic communication with bypass outlet 9C. With reference to FIG. 1, in this example first inlet passage 404A may receive coolant expelled from an engine block (e.g., engine block 2B), second inlet passage 404B may receive coolant expelled from a cylinder head (e.g., cylinder head 2A), first outlet passage 406A may route coolant to a radiator (e.g., radiator 17 via radiator feed line 16), second outlet passage 406B may route coolant to a plurality of components (e.g., via component line 12), and third outlet passage 406C may route coolant to a bypass line (e.g., bypass line 11).

Control coolant flow through passages 404A-C and 406A-B may be controlled by varying the position of wax motors 402A and 402B along respective longitudinal axes 408A and 408B. Wax motors 402A and 402B include geometric features that may or may not engage respective valves depending on their respective longitudinal positions. For example, a first shoulder 410A of wax motor 402A is configured to engage a first valve 412A that controls coolant flow flowing into thermostat 400 from first inlet passage 404A, a second shoulder 410B of wax motor 402A is configured to engage a second valve 412B that controls coolant flow into third outlet passage 406C, and a third shoulder 410C of wax motor 402B is configured to engage a third valve 412C that controls coolant flow into first outlet passage 406A. Each shoulder 410 has a corresponding longitudinal position of its associated wax motor 402 at which the shoulder engages (e.g., makes physical contact along its associated longitudinal axis 408) its corresponding valve 412. When sufficient additional force is applied to a given valve 412 along its associated longitudinal axis 408 (e.g., due to the longitudinal motion of its associated wax motor 402, coolant flow, and/or differential pressure across the valve) by its corresponding shoulder 410, the shoulder causes the valve to disengage from its corresponding valve seat 414, where, when engaged with the valve seat it resides in a fully closed position, and move toward an at least partially open position, allowing at least some coolant flow between the passages it controls. In the depicted implementation, first valve 412A has a valve seat 414A, second valve 412B has a valve seat 414B, and third valve 412C has a valve seat 414C. Valves 412A, 412B, and 412C may thus be referred to as a valve assembly collectively driven by wax motors 402A and 402B, which position the valves to control coolant flow.

Figure 4B:
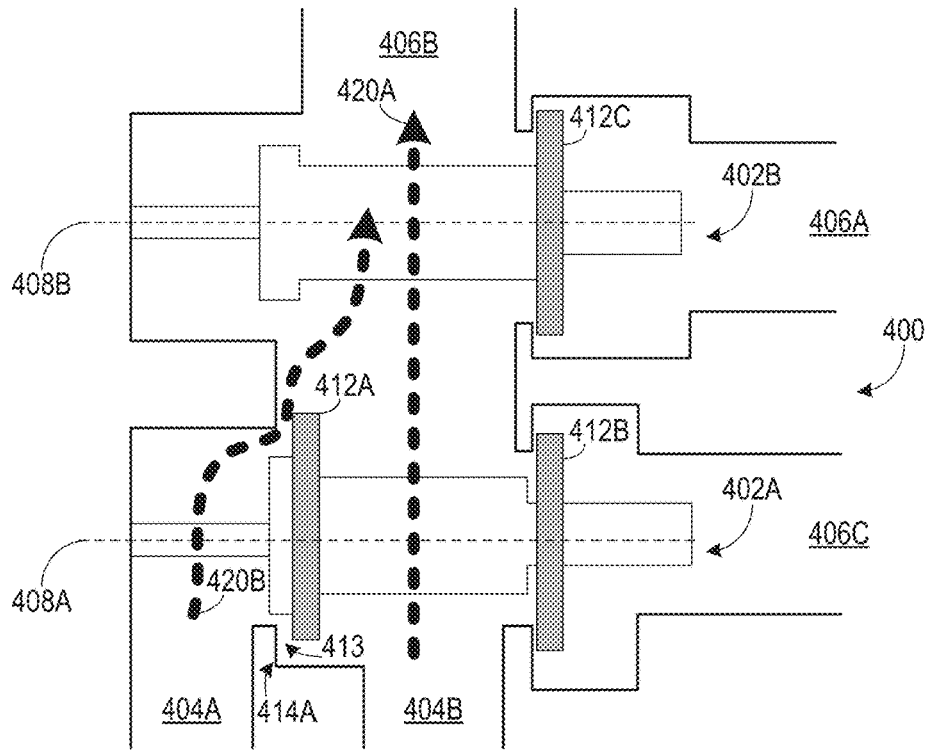

Thermostat 400 is configured such that, when a valve 412 assumes an at least partially open position, a gap (e.g., gap 413 of FIG. 4B) is formed between its outer perimeter and the surfaces of its corresponding valve seat 414 with which the valve engages when in its fully closed position, such that coolant may flow through the gap. As an illustrative example, FIG. 4A shows first valve 412A in its fully closed position and in sealing, physical contact with valve seat 414A. In FIG. 4B, wax motor 402 has assumed a different longitudinal position that is farther advanced (e.g., rightward in FIG. 4B) relative to its longitudinal position shown in FIG. 4A; in this position, the application of a sufficient force by first shoulder 410A to first valve 412A causes the first valve to disengage valve seat 414A and assume a partially open position enabling the reception of coolant from first inlet passage 404A.

Thermostat 400 may include suitable mechanisms to enable the longitudinal motion of valves 412 and restrain the valves in their fully closed positions against their corresponding valve seats 414 when wax motors 402 are at longitudinal positions that close the valves, such as the first longitudinal position of wax motor 402A shown in FIG. 4A in which coolant flows between second inlet passage 404B and second outlet passage 406B, and not between the other passages. For example, respective biases (e.g., springs) similar to bias 315 of FIG. 3A may be included for each of wax motors 402A and 402B. The biases may be placed in various suitable locations (e.g., for wax motor 402A between valves 412A and 412B), and may be selected such that valve opening occurs during select conditions—e.g., when a backpressure equal to or greater than a threshold backpressure acts against the valves. Since such backpressures may correspond to engine (e.g., pump) speed, flow control, and particularly valve opening timings, may proceed according to pump speed.

In some examples, valves 412 may be partially toroidal with a hollow bore through their centers whose diameters are large enough to accommodate sliding motion of a corresponding portion of their associated wax motors 402 therethrough yet small enough to enable their corresponding shoulders 410 to catch against their bottom surfaces and drive the valves upwardly with sufficient application of force. A suitable mechanism may be included to facilitate this selective restraint and sliding motion of valves 412, such as a bushing affixed to the bore (e.g., the inner bore surface).

As with wax motor 302, wax motors 402 may undergo longitudinal motion along their respective longitudinal axes 408 by converting thermal energy into mechanical energy. Specifically, the material compositions of wax motors 402 may include one or more waxes whose volumes change as a function of temperature. In some examples, a single wax blend of two or more waxes may be provided, such that the volume of the overall wax blend changes as a function of temperature. Thus, the reception of thermal energy in coolant flowing proximate (e.g., across) wax motors 402 (e.g., heated coolant expelled from engine 20 of FIG. 2) may cause a change in the volume of the one or more waxes of the wax motor, resulting in longitudinal motion of the wax motor. In particular, an increase in the volume of wax motors 402 may cause upward advancement along their respective longitudinal axes 408. In this way, thermostat 400 may self-regulate coolant flow through its passages as a function of the temperature of the coolant flowing through the thermostat.

In some embodiments, wax motors 402A and 402B may include respective rods 416A and 416B comprising one or more non-wax materials (e.g., one or more metals) positioned along longitudinal axes 408A and 408B, respectively, and extending at least a portion of the height of their associated wax motor (e.g., from the base of the motor to a region proximate shoulders 410B and 410C). A portion of each wax motor 402 surrounding its associated rod 416—for example, body 418A, which in some examples may be the entirety of the wax motor surrounding the rod—may comprise one or more waxes whose expansion or contraction cooperates with the rod to impart longitudinal motion to the wax motor. In some implementations, an annular component (e.g., bushing) may concentrically surround rods 416 to enable sliding motion of the associated bodies about the rod.

As described above, the material composition of wax motors 402 (e.g., their bodies) may include one or more waxes. In some embodiments, one or more waxes may be included in wax motors 402 whose material properties are selected such that desired correspondences between wax volume changes, longitudinal positions, and coolant temperatures are achieved. Specifically, the one or more waxes may be chosen so that wax motors 402 begin to undergo longitudinal motion when coolant of a particular temperature flows across the wax motor. In this way, coolant temperature and the material properties of the one or more waxes in wax motors 402 may cooperate to enable self-regulation of coolant flow through the wax motors. The one or more waxes may also be chosen so that a desired rate of longitudinal motion of wax motors 402 results when temperature changes occur in the coolant flowing across the wax motors—e.g., the one or more waxes may be selected in view of a desired rate of motion in distance per degree temperature change (e.g., mm/° C.). In some examples, changes in the longitudinal position of wax motors 402 may result from expansion of the volume of the one or more waxes; these volume changes may or may not be accompanied by changes in phase of the one or more waxes (e.g., a phase transition from solid to liquid). Accordingly, temperature changes in the coolant flowing across wax motors 402 may cause continuous changes in the longitudinal position of the wax motor, facilitating continuous placement of the wax motor and thus continuous coolant flow control. It will also be appreciated that wax motors 402 may undergo continuous longitudinal motion as coolant temperatures vary. As such, first, second, third, fourth, and fifth wax motor positions may include respective ranges of longitudinal positions of wax motors 402. However, in each respective range the wax motors may maintain the corresponding valve assembly configuration (e.g., placements). Thus, the first, second, third, fourth, and fifth wax motor positions may refer to their corresponding valve assembly configurations.

Wax motors 402A and 402B may include one or more of the same waxes; in some examples the wax motors may include the same waxes. In other embodiments, wax motors 402A and 402B may include dissimilar waxes, which may allow each wax motor to have different expansion characteristics at different coolant temperatures.

FIG. 4A particularly shows wax motors 402 in a first (longitudinal) position. "Longitudinal position" as used herein when referring to wax motors 402 of thermostat 400 may denote a spatial configuration of both wax motors 402A and 402B. For a given longitudinal position used to refer to wax motors 402A and 402B collectively, wax motors 402A and 402B may assume different individual longitudinal positions (e.g., the longitudinal position of wax motor 402A as measured along longitudinal axis 408A may differ from the longitudinal position of wax motor 402B as measured along the same longitudinal axis 408A). In the first position, all valves 412A, 412B, and 412C reside in their fully closed positions and in contact with their respective valve seats (seats 414A, 414B, and 414C). As such, coolant flows between second inlet passage 404B and second outlet passage 406B (a first coolant flow represented by arrow 420A), and not between the other passages. With reference to FIG. 1, the first position may allow coolant flow between head inlet 8A and component outlet 9B and thus between cylinder head 2A and component line 12, for example, in which case heated coolant expelled from the cylinder head may be supplied to the components positioned along the component line. Wax motors 402 may assume the first position for a first range of coolant temperatures up to a first threshold coolant temperature. The first range of coolant temperatures may include relatively low temperatures including those associated with cold engine start, for example. In some examples, the tops (e.g., rightward most portions in FIG. 4A) of wax motors 402 may be flush in the first position—for example, as measured along an axis perpendicular to longitudinal axes 408.

FIG. 4B shows wax motors 402 in a second position in which wax motor 402A is farther advanced along longitudinal axis 408A relative to the first position and relative to wax motor 402B. In the second position, second and third valves 412B and 412C remain in their fully closed positions, while first valve 412A has assumed a partially open position, disengaging from contact with its associated valve seat 414A. As a result, coolant flows between first inlet passage 404A and second outlet passage 406B (a second coolant flow represented by arrow 420B), in addition to the coolant flow between second inlet passage 404B and the second outlet passage, and not between the other passages. With reference to FIG. 1, the second position may allow coolant flow between block inlet 8B and component outlet 9B and thus between engine block 2B and component line 12, for example, in which case heated coolant expelled from the engine block may be supplied to the components positioned along the component line. The rate of transfer of thermal energy to such components may be greater when wax motors 402 are in the second position than when they are in the first position, and in some scenarios, heat transfer out of engine block 2B may be greater in the second position relative to the first position, which may aid in maintaining block temperature below a threshold temperature. Wax motors 402 may assume the second position for a second range of coolant temperatures up to a second threshold coolant temperature. The second range of coolant temperatures may be greater than the first range of coolant temperatures. Thermostat 400 may include suitable components not shown in FIGS. 4A-E to support bidirectional motion of wax motors 402 along their respective longitudinal axes 408 and particularly such motion in and out of the leftward surfaces from which they extend.

Figure 4C:
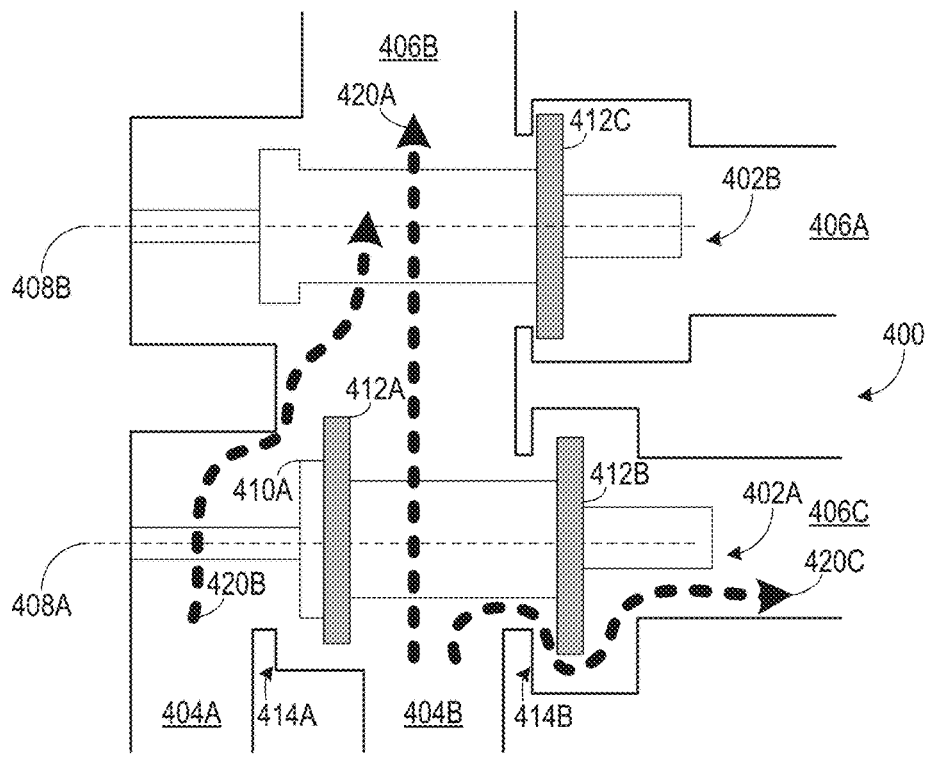

FIG. 4C shows wax motors 402 in a third position in which wax motor 402A is farther advanced along longitudinal axis 408A relative to the second position and relative to wax motor 402B. In the third position, third valve 412C remains at its fully closed position, while second valve 412B has assumed an at least partially open position, disengaging from contact with its associated valve seat 414B. As a result, coolant flows between second inlet passage 404B and third outlet passage 406C (a third coolant flow represented by arrow 420C), in addition to the coolant flow between second inlet passage 404B and the second outlet passage, and between first inlet passage 404A and the second outlet passage. In the third position, coolant flows between these passages and not between the other passages. With reference to FIG. 1, the third position may allow coolant flow between head inlet 8A and bypass outlet 9C and thus between cylinder head 2A and bypass line 11, for example, in which case a greater amount of uncooled coolant may be rerouted back to engine 2, relative to the first and second positions. Wax motors 402 may assume the third position for a third range of coolant temperatures up to a third threshold coolant temperature. The third range of coolant temperatures may be greater than the second range of coolant temperatures. In the third position, relative to the second position, the clearance between first shoulder 410A and the leftward surface of first inlet passage 404A has increased.

Figure 4D:
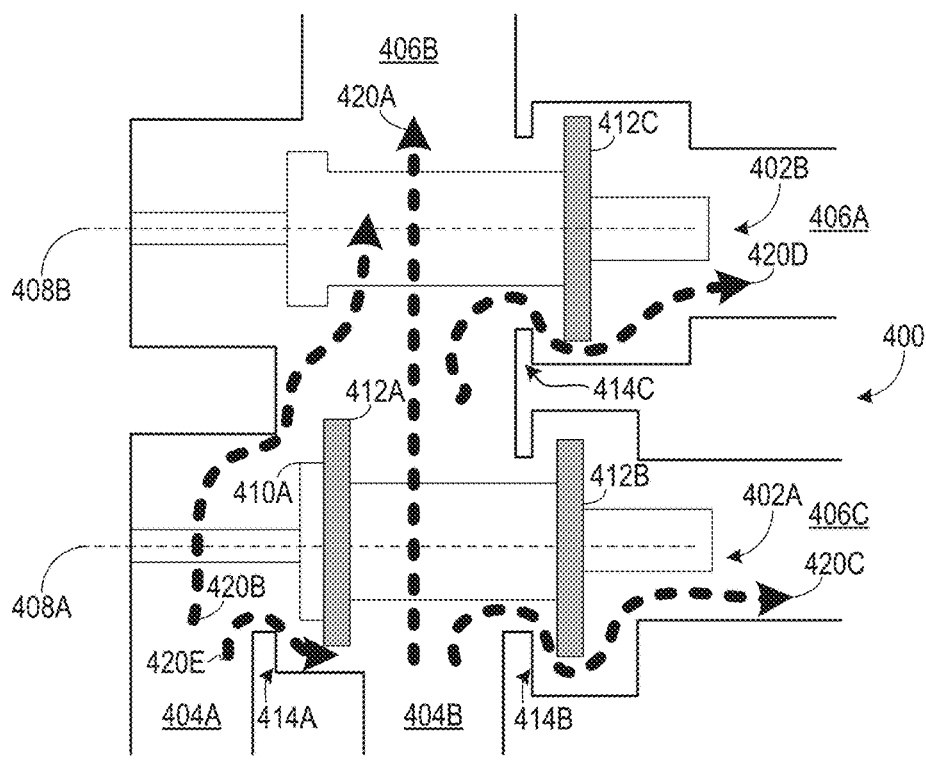

FIG. 4D shows wax motors 402 in a fourth position in which wax motor 402A remains in the same position in which it resided when the wax motors were in the third position, and in which wax motor 402B is farther advanced along longitudinal axis 408B relative to the third position. In the fourth position, relative to the third position, third valve 412C has advanced farther along longitudinal axis 408B, moving away from valve seat 414C, assuming an at least partially open (e.g., fully) position. First and second valves 412A and 412B remain in their respective positions (e.g., at least partially open positions) in which they resided when wax motors 402 resided in the third position, though in other examples one or both of these positions may vary as the transition from the third position to the fourth position is made. As a result of such valve placement, coolant flows into first outlet passage 406D (a fourth coolant flow represented by arrow 420D). As shown in FIG. 4D, the source of this coolant flow into first outlet passage 406D may be one or more of the coolant flows represented by 420A, 420B, and 420C. This coolant flow is in addition to the coolant flow between first inlet passage 404A and second outlet passage 406B, second inlet passage 404B and the second outlet passage, the second inlet passage and third outlet passage 406C, and the first inlet passage and the second inlet passage, represented by an arrow 420E. Thus, in the fourth position, all inlet passages of thermostat 400 expel coolant while all outlet passages receive coolant. With reference to FIG. 1, the fourth position may allow coolant flow out of radiator outlet 9A and thus to radiator 17, for example. In the fourth position, a portion of coolant received by the inlet passages of thermostat 400 (e.g., coolant received through first inlet passage 404A) may be cooled via a radiator, while a different portion of coolant (e.g., coolant received through second inlet passage 404B) may be bypassed around the radiator and not cooled. When in the fourth position, thermostat 400 may facilitate the supply of a blend of cooled and uncooled coolant to engine 2 (FIG. 1). Wax motors 402 may assume the fourth position for a fourth range of coolant temperatures up to a fourth threshold coolant temperature. The fourth range of coolant temperatures may be greater than the third range of coolant temperatures. In the fourth position, relative to the third position, the clearance between first shoulder 410A and the leftward surface of first inlet passage 404A has increased.

Figure 4E:
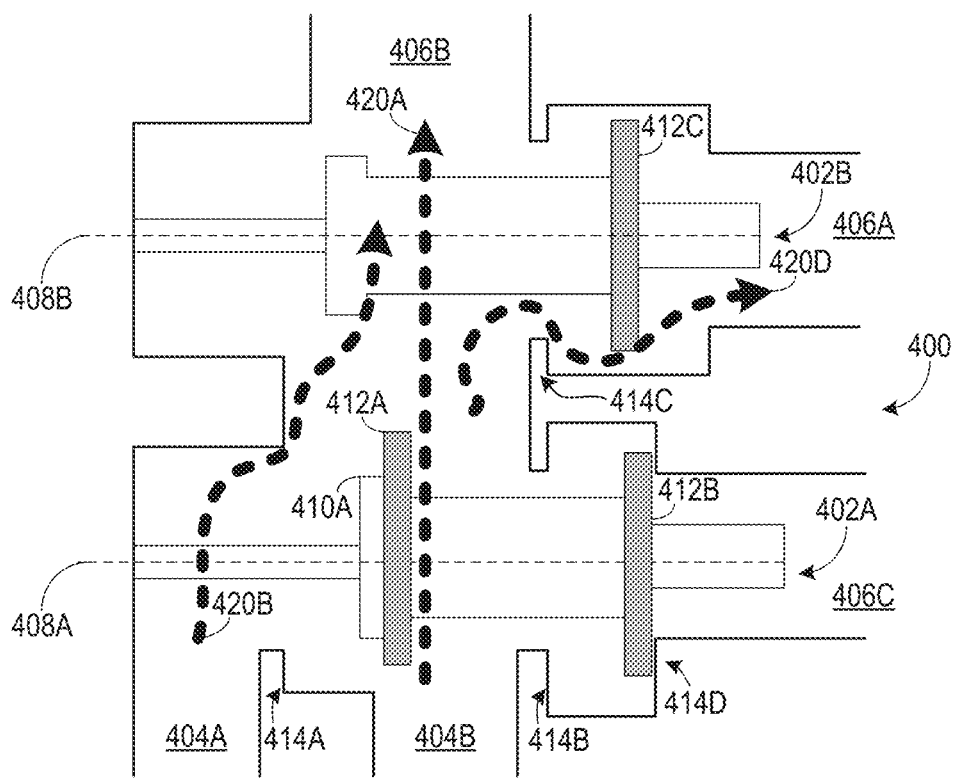

FIG. 4E shows wax motors 402 in a fifth position in which both wax motors 402A and 204B have advanced farther along longitudinal axes 408A and 408B, respectively, relative to the fourth position. In the depicted example, wax motor 402A has undergone greater longitudinal motion than wax motor 402B. As such, in the fifth position, relative to the fourth position, all valves 412 have advanced farther along their respective longitudinal axes 408. Specifically, first and third valves 412A and 412C have moved away from their associated valve seats 414, assuming relatively more open (e.g., fully open) positions. Conversely, second valve 412B has come into contact with a valve seat 414D, which is relatively rightward of valve seat 414B, assuming a fully closed position. As a result of such valve placement, coolant flow into third outlet passage 406C ceases; with reference to FIG. 1, coolant flow out of bypass outlet 9C and into bypass line 11 may thus cease, maximizing coolant flow through radiator outlet 9A and radiator 17, in turn maximizing coolant cooling. Coolant flow persists, however, between first inlet passage 404A and second outlet passage 406B, second inlet passage 404B and the second outlet passage, and into first outlet passage 406A. In this way, wax motors 402 allow thermostat 400 to automatically maximize cooling through the radiator in response to relatively high coolant temperatures, as these temperatures, when in thermal communication with the wax motors, cause a change in volume of the wax motors that drives their placement in the fifth position where cooling may be maximized. Wax motors 402 may assume the fifth position for a fifth range of coolant temperatures, which may include a maximum coolant temperature. The fifth range of coolant temperatures may be greater than the fourth range of coolant temperatures. In the fifth position, the clearance between first shoulder 410A and the leftward surface of first inlet passage 404A may be maximized.

Various modifications may be made to thermostat 400 without departing from the scope of this disclosure. For example, biases (e.g., springs) may be included in thermostat 400 to bias one or both of wax motors 402A and 402B to respective desired positions—e.g., those corresponding to the first collective position. The force provided by the bias may be selected so that other positions (the second, third, fourth, and fifth positions) are achieved when sufficient force generated by wax expansion counteracts the bias force (alternatively or in addition to pressure generated by pump 19). Further, the coolant flows of thermostat 400 at the five positions shown in FIGS. 4A-E may be modified without departing from the scope of this disclosure; the thermostat may be configured such that coolant flow is established between virtually any pair of inlet and outlet passages at any position. Generally, the approaches described herein may apply to a wax motor thermostat configured to mediate coolant flow between at least two passages. Moreover, the number and geometric arrangement of the inlet and outlet passages may be modified, with accompanying changes to other elements of thermostat 400 possible (e.g., changes to the arrangement of the valves, valve seats, shoulders, etc.).

Thermostat 400 also generally illustrates the configuration and operation of thermostats that utilize two or more wax motors; as such, thermostats that utilize three or more wax motors are within the scope of this disclosure. While wax motors 402 are depicted as undergoing longitudinal motion along longitudinal axes 408, the wax motors may undergo alternative or additional types of motion; for example, the wax motors may achieve longitudinal motion by undergoing rotational motion in a threaded fashion as its waxe(s) expand. Moreover, the five range of coolant temperatures associated with their respective five wax motor positions may or may not overlap.

In some examples, wax motors 402 may always be at least partially immersed in coolant flowing across the wax motors—for example, coolant from at least cylinder head 2A (FIG. 2). As such, self-regulation of coolant flow among the passages of wax motors 402 may be facilitated without electronic control of the wax motors or their valves. Other functions described herein, such as allowing coolant flow from engine block 2B later than allowing coolant flow from cylinder head 2A, and allowing bypass coolant flow at relatively elevated coolant temperatures, are also facilitated in a self-regulated manner without electronic control.

FIG. 5 shows a graph 500 of coolant flow through various passages in a thermostat that utilizes at least one wax motor. Graph 500 particularly illustrates coolant flow between five passages in the thermostat—specifically, two inlet passages and three outlet passages, as a function of the temperature of coolant flowing through the thermostat. Graph 500 may exhibit the same type of coolant flow for other independent variables, however, such as coolant pressure. The thermostat represented in graph 5 may be thermostat 7, 300, or 400, for example. Moreover, a correspondence between the five inlet passages represented in graph 5 and those of thermostat 300 and/or 400 may exist; the first inlet passage may be first inlet passage 304A or 404A, the second inlet passage may be second inlet passage 304B or 404B, the first outlet passage may be first outlet passage 306A or 406A, the second outlet passage may be second outlet passage 306B or 406B, and the third outlet passage may be third outlet passage 306C or 406C.

As shown in FIG. 5, coolant flow is persistently received from the second inlet passage and is persistently expelled from the second outlet passage throughout the illustrated range of coolant temperatures. Beginning at the first threshold (coolant) temperature, coolant is received from the first inlet passage and for coolant temperatures above the first threshold temperature. Between the second threshold temperature and the fourth threshold temperature, coolant flow is expelled from the third outlet passage. Below the second threshold temperature and above the fourth threshold temperature, however, coolant is not expelled from the third outlet passage. Finally, beginning at the third threshold temperature, and for coolant temperatures thereabove, coolant is expelled from the first outlet passage.

It will be appreciated that graph 500 is provided as an example and is not intended to be limiting. It will be understood that for one or more of the three outlet passages, the coolant flow they receive may be from a single inlet passage or may be a mixture of coolant received from both inlet passages. Further, coolant flow depicted in FIG. 5 may be affected by other factors such as valve and valve seat design, for example.

As shown and described, wax motors 302, 402A, and 402B may be used to self-regulate coolant flow between two or more passages and thus between two or more engine components. For example, the wax motors may be used to self-regulate the reception (and subsequent distribution) of coolant from a cylinder head and an engine block without electronic control, which may reduce cost and complexity. Further, wax heating (and thus consequent wax motor motion) is achieved by placing wax in thermal communication with coolant, in contrast with other approaches in which wax is electrically heated.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A thermostat, comprising:
    a first wax motor and a second wax motor,
    the first wax motor having a first valve and a second valve and extending between a first inlet and a third outlet,
    the second wax motor having a first valve on a first end, and the first valve of the second wax motor positioned in a valve seat of a first outlet,
    the first wax motor and second wax motor mediates coolant flow between two inlets and three outlets as a function of a valve assembly position, the valve assembly position varying in response to changes in coolant temperature,
    in a first valve assembly position of each the first and second wax motor, each valve allows coolant flow between a second inlet and a second outlet, and respective valves prevent flow out of the first inlet and into the third outlet, in a second valve assembly position, the first valve of the first wax motor is spaced away from a valve seat of the first inlet to allow coolant flow between the first inlet and the second outlet in addition to the coolant flow between the second inlet and the second outlet, and the second valve of the first wax motor is positioned contacting a first valve seat of the third outlet preventing flow into the third outlet, in a third valve assembly position, the first valve and second valve of the first wax motor are each positioned away from respective valve seats allowing flow, and in a fourth valve assembly position, the second valve of the first wax motor contacts a second valve seat of the third outlet preventing flow, and the first valve of the first wax motor remains spaced away from the valve seat of the first inlet allowing flow.

2. The thermostat of claim 1, wherein at least one of the wax motors comprises at least one wax whose volume changes in response to the changes in coolant temperature, the volume changes causing variation in the valve assembly position.

3. The thermostat of claim 1, wherein the first inlet is in fluidic communication with an engine block and the second inlet is in fluidic communication with a cylinder head.

4. The thermostat of claim 3, wherein the second outlet in fluidic communication with a component line including a heater core; and wherein, in the third valve assembly position, the wax motors allows coolant flow between the second inlet and the third outlet in addition to the coolant flow between the first inlet and the second outlet and the coolant flow between the second inlet and the second outlet, the third outlet in fluidic communication with a bypass line that enables heated coolant expelled from an engine and routed through the thermostat to flow back to the engine without being cooled, the bypass line fluidly coupled to the component line downstream of the thermostat and the heater core.

5. The thermostat of claim 4, wherein the first outlet in fluidic communication with a radiator.

6. The thermostat of claim 5, wherein, in a fifth valve assembly position, the wax motors cease the coolant flow between the second inlet and the third outlet but continues to allow the coolant flow between the first inlet and the first outlet, the coolant flow between the first inlet and the second outlet, and the coolant flow between the second inlet and the second outlet.

7. The thermostat of claim 1, wherein the first wax motor includes the first valve that controls whether coolant is received from the first inlet via movement of the first valve and the second valve that controls whether coolant is expelled into the third outlet via movement of the second valve, the first valve disposed between the first valve seat and the second valve seat and the second valve disposed between the second valve seat and a third valve seat, with the first inlet in fluidic communication with an engine block, and with the third outlet in fluidic communication with a bypass line that enables heated coolant expelled from an engine and routed through the thermostat to flow back to the engine without being cooled.

8. The thermostat of claim 7, wherein the first valve of the second wax motor that controls whether coolant is expelled into a first outlet via movement of the third valve, with the first outlet in fluidic communication with a radiator, wherein the thermostat includes exactly three valves with a second inlet of the two inlets in fluidic communication with a second outlet when each of the exactly three valves is in a fully closed position.

9. The thermostat of claim 1, wherein, when the first and second wax motors are collectively in the first valve assembly position, coolant flows from the second inlet of the two inlets to the second outlet, the second inlet in fluidic communication with a cylinder head, the second outlet in fluidic communication with a component line including a heater core.

10. The thermostat of claim 1, wherein a wax body of the at least one wax motor is in physical contact with coolant flowing from at least one of the two inlets regardless of the valve assembly position.

11. A thermostat, comprising:
a first wax motor and a second wax motor,
the first wax motor having a first valve and a second valve and extending between a first inlet and a third outlet,
the second wax motor having a first valve on a first end, and the first valve of the second wax motor positioned in a valve seat of a first outlet,
the wax motors controls distribution of engine coolant to a plurality of coolant lines as a function of coolant temperature, where:
in a first range of coolant temperatures and a first valve assembly position of each the first and second wax motor, all valves of the wax motors are in a closed position but wax motors allows a first coolant flow between a cylinder head from a second inlet and second outlet to a component line,
in a second range of coolant temperatures greater than the first range and in a second valve assembly position, the first valve of the first wax motor moves to an open position to allows a second coolant flow from an engine block to the component line in addition to the first coolant flow to the component line,
in a third range of coolant temperatures greater than the second range and in a third valve assembly position, the second valve of the first wax motor moves to an open position to allows a third coolant flow from the cylinder head through the thermostat to a bypass line in addition to the first and second coolant flows,
in a fourth range of coolant temperatures greater than the third range and in a fourth valve assembly position, the first valve of the second wax motor moves to an open position to wax motors allows a fourth coolant flow into a radiator in addition to the first, second, and third coolant flows, and
in a fifth range of coolant temperatures greater than the fourth range and in a fifth valve assembly position, the second valve of the first wax motor moves to a second closed position and ceases coolant flow to the bypass line.

12. The thermostat of claim 11, wherein the first range of coolant temperatures includes an engine cold start temperature.

13. The thermostat of claim 11, wherein the fifth range of coolant temperatures includes a maximum coolant temperature.

14. A thermostat, comprising:
a valve assembly including a plurality of valves and driven by at least one wax motor, the valve assembly mediating coolant flow between two inlets and three outlets as a function of valve assembly position, the valve assembly position varying in response to changes in coolant temperature, a first wax motor and a second wax motor, the first wax motor having a first valve and a second valve and extending between a first inlet and a third outlet, the second wax motor having a first valve on a first end, and the first valve of the second wax motor positioned in a valve seat of a first outlet, wherein, in a first valve assembly position of each the first and second wax motor, the valve assembly allows coolant flow between a second inlet and a second outlet, the second inlet in fluidic communication with a cylinder head, the second outlet in fluidic communication with a component line including a heater core, and respective valves prevent flow out of the first inlet and into the third outlet, wherein, in a second valve assembly position, the first valve of the first wax motor is spaced away from a valve seat of the first inlet to allow coolant flow between the first inlet and the second outlet in addition to the coolant flow between the second inlet and the second outlet, the first inlet in fluidic communication with an engine block, and the second valve of the first wax motor is positioned contacting a first valve seat of the third outlet preventing flow into the third outlet;

in a third valve assembly position, the first valve and second valve of the first wax motor are each positioned away from respective valve seats allowing flow;

in a fourth valve assembly position, the second valve of the first wax motor contacts a second valve seat of the third outlet preventing flow, and the first valve of the first wax motor remains spaced away from the valve seat of the first inlet allowing flow; and wherein, for each valve of the plurality of valves, a center of each of the plurality of valves includes a hollow bore shaped to accommodate a sliding motion of a corresponding wax motor of the at least one wax motor.

15. The thermostat of claim 14, wherein each valve is toroidal, and wherein, in the third valve assembly position, the valve assembly allows coolant flow between the second inlet and the third outlet in addition to the coolant flow between the first inlet and the second outlet and the coolant flow between the second inlet and the second outlet, the third outlet in fluidic communication with a bypass line that enables heated coolant expelled from an engine to be routed through the thermostat and back to the engine without being cooled.

16. The thermostat of claim 15, wherein, in the fourth valve assembly position, the valve assembly allows coolant flow between both inlet the three outlets, and wherein, in a fifth valve assembly position, the valve assembly ceases the coolant flow between both inlets and the third outlet but continues to allow the coolant flow between both inlets and a first outlet and the coolant flow between both inlets and the second outlet.

17. The thermostat of claim 1, wherein the wax motors comprise:

at least one wax capable of expansion and contraction to move each of the first valve, the second valve, and the first valve of the second wax motor in relation to a corresponding shoulder and in relation to a corresponding valve seat, each of the corresponding shoulders being movable longitudinally during expansion and contraction of the at least one wax.

18. The thermostat of claim 17, wherein the first valve is disposed over the valve seat of the first inlet, the second valve is disposed between two valve seats and over the third outlet, and the third valve is disposed with the valve seat of the third outlet.

* * * * *